(12) United States Patent
Fan et al.

(10) Patent No.: US 12,483,114 B2
(45) Date of Patent: Nov. 25, 2025

(54) SINGLE-INDUCTOR MULTIPLE-OUTPUT DC-DC CONVERTER

(71) Applicants: National Cheng Kung University, Tainan (TW); Himax Technologies Limited, Tainan (TW)

(72) Inventors: Ming-Yan Fan, Tainan (TW); Yi-Fu Chen, Tainan (TW); Bo-Rui Chen, Tainan (TW)

(73) Assignees: National Cheng Kung University, Tainan (TW); Himax Technologies Limited, Tainan (TW)

( * ) Notice: Subject to any disclaimer, the term of this patent is extended or adjusted under 35 U.S.C. 154(b) by 184 days.

(21) Appl. No.: 18/395,905

(22) Filed: Dec. 26, 2023

(65) Prior Publication Data
US 2025/0211090 A1 Jun. 26, 2025

(51) Int. Cl.
*H02M 3/158* (2006.01)
*H02M 1/00* (2006.01)

(52) U.S. Cl.
CPC ......... *H02M 1/009* (2021.05); *H02M 1/0032* (2021.05); *H02M 3/158* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/42; H02M 1/4208; H02M 1/12; H02M 1/4225; H02M 1/4233; H02M 1/4241; H02M 1/4258; H02M 1/425
See application file for complete search history.

(56) References Cited

U.S. PATENT DOCUMENTS 10,291,126 B1 * 5/2019 Wei ....................... H02M 3/158
10,622,900 B1 4/2020 Wei et al.

* cited by examiner

*Primary Examiner* — Bryan R Perez
(74) *Attorney, Agent, or Firm* — Donald E. Stout; Stout, Uxa & Buyan, LLP

(57) ABSTRACT

A single-inductor multiple-output DC-DC converter includes a first power switch controlled by a first power switch signal and a second power switch controlled by a second power switch signal, connected in series between a positive supply voltage and a negative supply voltage, and interconnected at an input node; a single inductor with a first end connected to the input node; a plurality of output switches, controlled by corresponding output switch signals, connected in parallel with first ends connected to a second end of the inductor, second ends of the output switches, acting as output nodes, providing corresponding output voltages respectively; and a dual mode charge controller coupled to receive an input voltage at the input node, to receive the output voltages, to receive a state flag, and configured to accordingly generate the first and second power switch signals and the output switch signals.

9 Claims, 4 Drawing Sheets

SINGLE-INDUCTOR MULTIPLE-OUTPUT DC-DC CONVERTER

BACKGROUND OF THE INVENTION

1. Field of the Invention

The present invention generally relates to a DC-DC buck converter, and more particularly to a single-inductor multiple-output (SIMO) DC-DC converter.

2. Description of Related Art

The demand for the Internet of Things and edge computing continues to grow recently, and the maximum power consumption required by the device itself is also gradually increasing, which accelerates development of the battery-powered micro-devices for monitoring environments. The small form factor of the devices poses a severe energy constraint, as battery capacity is limited by its form factor. To extend battery life, multiple power supplies for a system on a chip (SoC) have proven to be an efficient operation.

Each block in SoC, such as computing, memory cache, always-on circuit, etc., can be implemented by using different voltage power supplies. To meet these demands, power management units (PMUs) with lower power consumption, greater output power, and higher conversion efficiency are essential to convert the battery voltage to multiple output voltages. However, traditional PMUs, such as linear regulators, switched capacitors or switched inductor converters, can only generate a single output voltage. Placing multiple PMUs on a tiny device can generate multiple voltages, but require more passive components and increase area. To meet this demand, a low power single-inductor multiple-output (SIMO) power converter can provide an alternative solution.

In low power systems, different functional blocks and dynamic voltage scaling need multiple supply voltages to improve power efficiency. Single-inductor multiple-output (SIMO) DC-DC converters are better than multiple single-inductor single-output converters for power management circuits because they use only one inductor to generate the different supply voltages. This reduces the volume weight, component counts and footprint area of the system.

A need has thus arisen to propose a novel scheme to generate multiple sets of output circuits with fewer passive components pressure. In order to extend the battery life of the device, a scheme with low static power consumption during standby and with wide load operating range is proposed to meet the power required by each block in the SOC.

SUMMARY OF THE INVENTION

In view of the foregoing, it is an object of the embodiment of the present invention to provide a single-inductor multiple-output (SIMO) DC-DC converter with low quiescent power consumption and wide load operating range.

According to one embodiment, a single-inductor multiple-output DC-DC converter includes a first and second power switches, a single inductor, a plurality of output switches and a dual mode charge controller. The first power switch controlled by a first power switch signal and the second power switch controlled by a second power switch signal are connected in series between a positive supply voltage and a negative supply voltage, and are interconnected at an input node. The inductor with a first end is connected to the input node. The output switches, controlled by corresponding output switch signals, are connected in parallel with first ends connected to a second end of the inductor, and second ends of the output switches, acting as output nodes, provide corresponding output voltages respectively. The charge controller is coupled to receive an input voltage at the input node, to receive the output voltages, to receive a state flag indicating operation status of load circuits powered by the output voltages, and configured to accordingly generate the first and second power switch signals and the output switch signals.

DETAILED DESCRIPTION OF THE INVENTION

Figure 1:
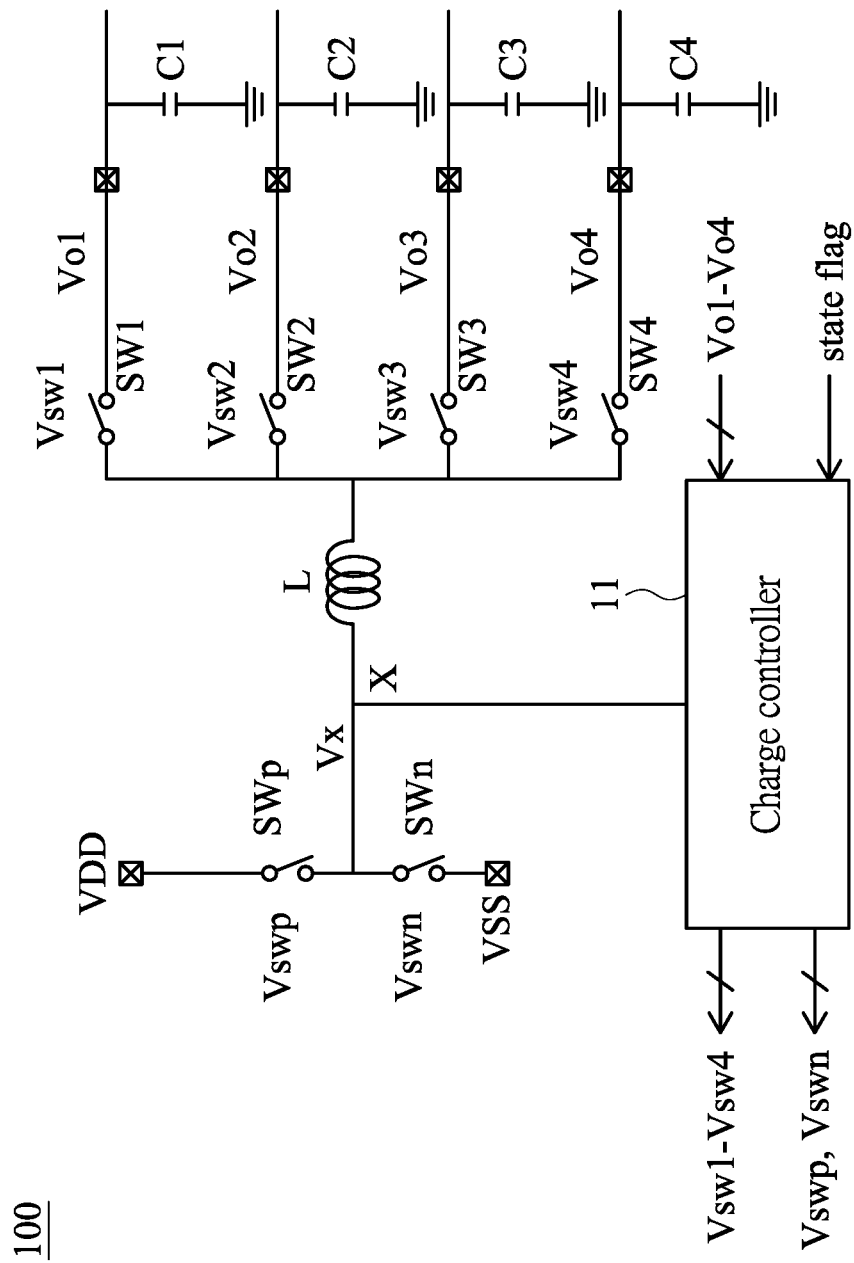
FIG. 1 shows a block diagram illustrating a single-inductor multiple-output (SIMO) DC-DC (direct-current to direct-current) converter according to one embodiment of the present invention.

FIG. 1 shows a block diagram illustrating a single-inductor multiple-output (SIMO) DC-DC (direct-current to direct-current) converter 100 according to one embodiment of the present invention.

Specifically, in the embodiment, the SIMO DC-DC converter (converter hereinafter) 100 may include a first power switch SWp (controlled by a first power switch signal Vswp) and a second power switch SWn (controlled by a second power switch signal Vswn) connected in series between a positive supply voltage VDD and a negative supply voltage VSS, and interconnected at an input node X. The converter 100 may include a (single) inductor L with a first end connected to the input node X.

The converter 100 of the embodiment may include a plurality of output switches (e.g., SW1 to SW4 controlled by corresponding output switch signals such as Vsw1 to Vsw4 respectively) connected in parallel with first ends connected to a second end of the inductor L. Second ends of the output switches SW1-SW4 (acting as output nodes (Vo1-Vo4) of the converter 100) provide corresponding output voltages (e.g., Vo1 to Vo4) respectively. It is noted that the output nodes share the same symbols (i.e., Vo1-Vo4) as the output voltages.

In the embodiment, the converter 100 may include a dual mode charge controller ("charge controller" hereinafter) 11 coupled to receive an input voltage Vx at the input node X, to receive the output voltages Vo1-Vo4, to receive a state flag (from power management not shown) indicating operation status of load circuits powered by the output voltages Vo1-Vo4, and configured to accordingly generate the (first and second) power switch signals Vswp and Vswn and the output switch signals Vsw1-Vsw4. Specifically speaking, the output voltages Vo1-Vo4 as provided are sequentially time-shared by a current flowing through the inductor L. The charge controller 11 may include an energy distribution circuit (not shown) configured to measure total energy required by all the output nodes Vo1-Vo4 (i.e., energy stored at corresponding output capacitors C1-C4). The charge controller 11 may include an energy generating circuit (not shown) configured to provide the same amount of the total energy from the input node X. Therefore, the required energy and the provided energy are substantially equal. Details of the energy distribution circuit, the energy generating circuit and other portions of the charge controller 11 may be referred to "A 0.016 mV/mA Cross-Regulation 5-Output SIMO DC-DC Buck Converter Using Output-Voltage-Aware Charge Control Scheme" by Ngoc-Son Pham et al., "Near-Independently Regulated 5-Output Single-Inductor DC-DC Buck Converter Delivering 1.2 W/mm$^2$ in 65 nm CMOS" by Chien-Wei Kuan et al., and "The Stability Modeling of Ripple-Based Constant On-Time Control Schemes Used in the Converters Operating in DCM" by I-Chieh Wei et al., which are incorporated herein by reference.

Figure 2:
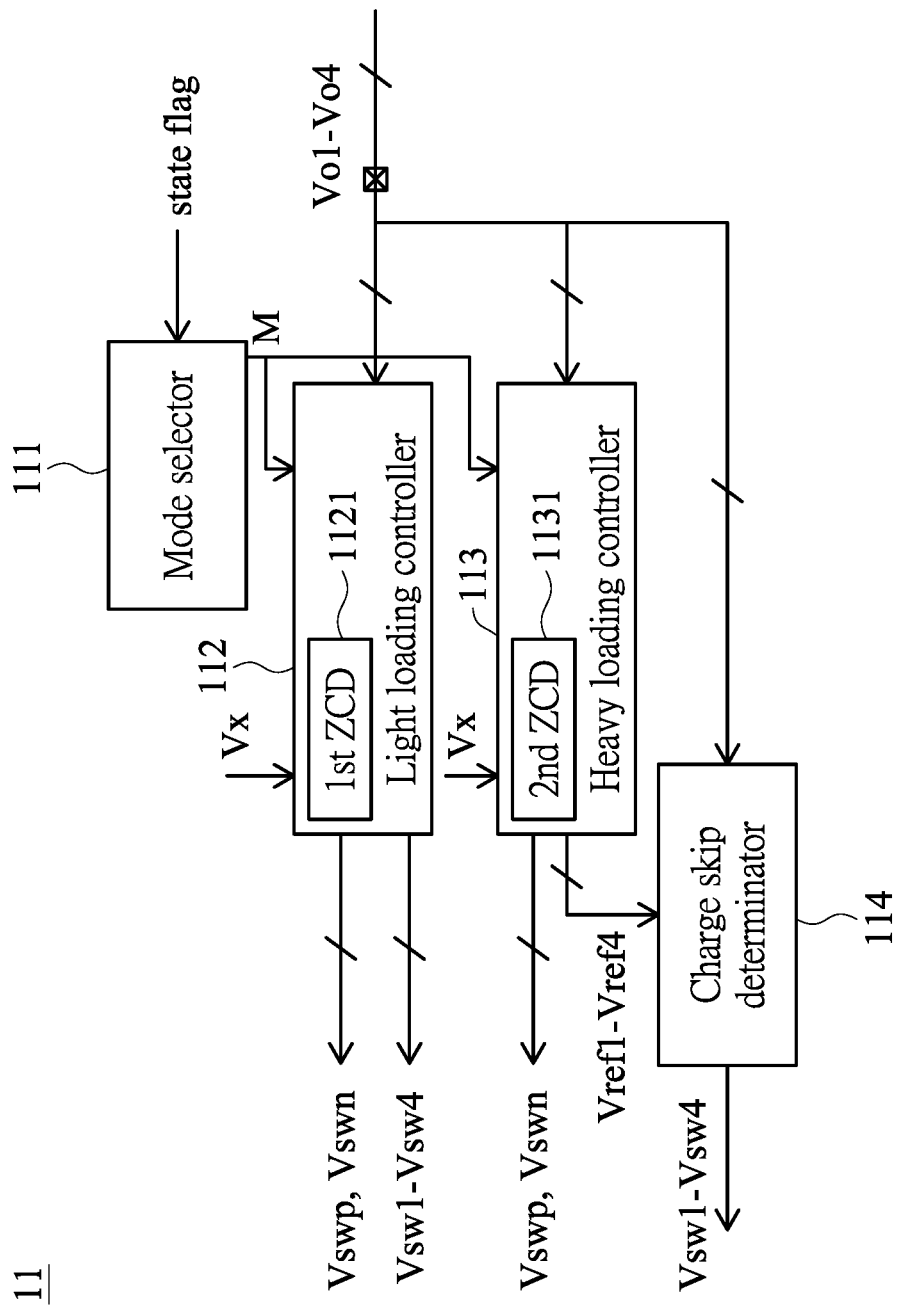
FIG. 2 shows a detailed block diagram illustrating the charge controller of FIG. 1 according to one embodiment of the present invention.

FIG. 2 shows a detailed block diagram illustrating the charge controller 11 of FIG. 1 according to one embodiment of the present invention. In the embodiment, the charge controller 11 may include a mode selector 111 configured to select between (at least) two modes of operation in the charge controller 11 according to the state flag, thereby generating a mode signal M. In the embodiment, when all load circuits powered by all output voltages Vo1-Vo4 are at sleep status as indicated by the state flag, the mode selector 11 selects a light loading (LL) mode; otherwise, the mode selector 11 selects a heavy loading (HL) mode.

In the embodiment, the charge controller 11 may include a light loading controller 112 controlled by the mode signal M, coupled to receive the output voltages Vo1-Vo4, and configured to generate the (first and second) power switch signals Vswp and Vswn and the output switch signals Vsw1-Vsw4. Therefore, the light loading controller 112 is activated by the mode signal M when the light loading mode is selected. The light loading controller 112 may be a time-multiplexing control scheme or a constant ON-time (COT) control scheme. Details of the light loading controller 112 may be referred to the aforementioned "The Stability Modeling of Ripple-Based Constant On-Time Control Schemes Used in the Converters Operating in DCM" by I-Chieh Wei et al., which is incorporated herein by reference.

According to one aspect of the embodiment, the light loading controller 112 may include a first zero current detector (ZCD) 1121 configured to detect a zero inductor current in the inductor L (before the reverse inductor current occurs) by comparing the input voltage Vx and the negative supply voltage VSS, thereby preventing reverse inductor current in discontinuous conduction mode (DCM). The reverse inductor current indicates that charge on the output capacitor Cx (x=1 to 4) is drawn away, which reduces the overall power conversion efficiency. When the zero inductor current is detected (by the first ZCD 1121), the (first and second) power switches SWp and SWn are turned off by corresponding (first and second) power switch signals Vswp and Vswn. Therefore, charges at the output capacitors C1-C4 at the output nodes Vo1-Vo4 can be maintained until next cycle.

In the embodiment, the charge controller 11 may include a heavy loading controller 113 controlled by the mode signal M, coupled to receive the output voltages Vo1-Vo4, and configured to generate the (first and second) power switch signals Vswp and Vswn. Therefore, the heavy loading controller 113 is activated by the mode signal M when the heavy loading mode is selected. The heavy loading controller 112 may be power-distributive-control scheme. Details of the heavy loading controller 113 may be referred to the aforementioned "A 0.016 mV/mA Cross-Regulation 5-Output SIMO DC-DC Buck Converter Using Output-Voltage-Aware Charge Control Scheme" by Ngoc-Son Pham et al., which is incorporated herein by reference.

According to one aspect of the embodiment, the heavy loading controller 113 may include a second zero current detector (ZCD) 1131 configured to detect a zero inductor current in the inductor L (before the reverse inductor current occurs) by comparing the input voltage Vx and the negative supply voltage VSS, thereby preventing reverse inductor current in discontinuous conduction mode (DCM). The reverse inductor current indicates that charge on the output capacitor Cx (x=1 to 4) is drawn away, which reduces the overall power conversion efficiency. When a zero inductor current is detected (by the second ZCD 1131), the (first and second) power switches SWp and SWn are turned off by corresponding (first and second) power switch signals Vswp and Vswn. Therefore, charges at the output capacitors C1-C4 at the output nodes Vo1-Vo4 can be maintained until next cycle.

According to another aspect of the embodiment, the charge controller 11 may include a charge skip determinator 114 configured to designate an output node Vox, x=1 to 4 (or more output nodes) as a skipping mode to save power consumption by turning off a corresponding output switch SWx, when power demand at said output node Vox drops. Specifically, in one embodiment, the skipping mode may be determined according to the output voltages Vo1-Vo4 and corresponding reference voltages Vref1-Vref4 respectively. The skipping mode is designated when the output voltage Vox at said output node Vox is greater than a corresponding reference voltage Vref. Accordingly, the heavy loading controller 113 in combination with the charge skip determinator 114 may generate the output switch signals Vsw1-Vsw4 to control the output switches SW1-SW4.

Figure 3A:
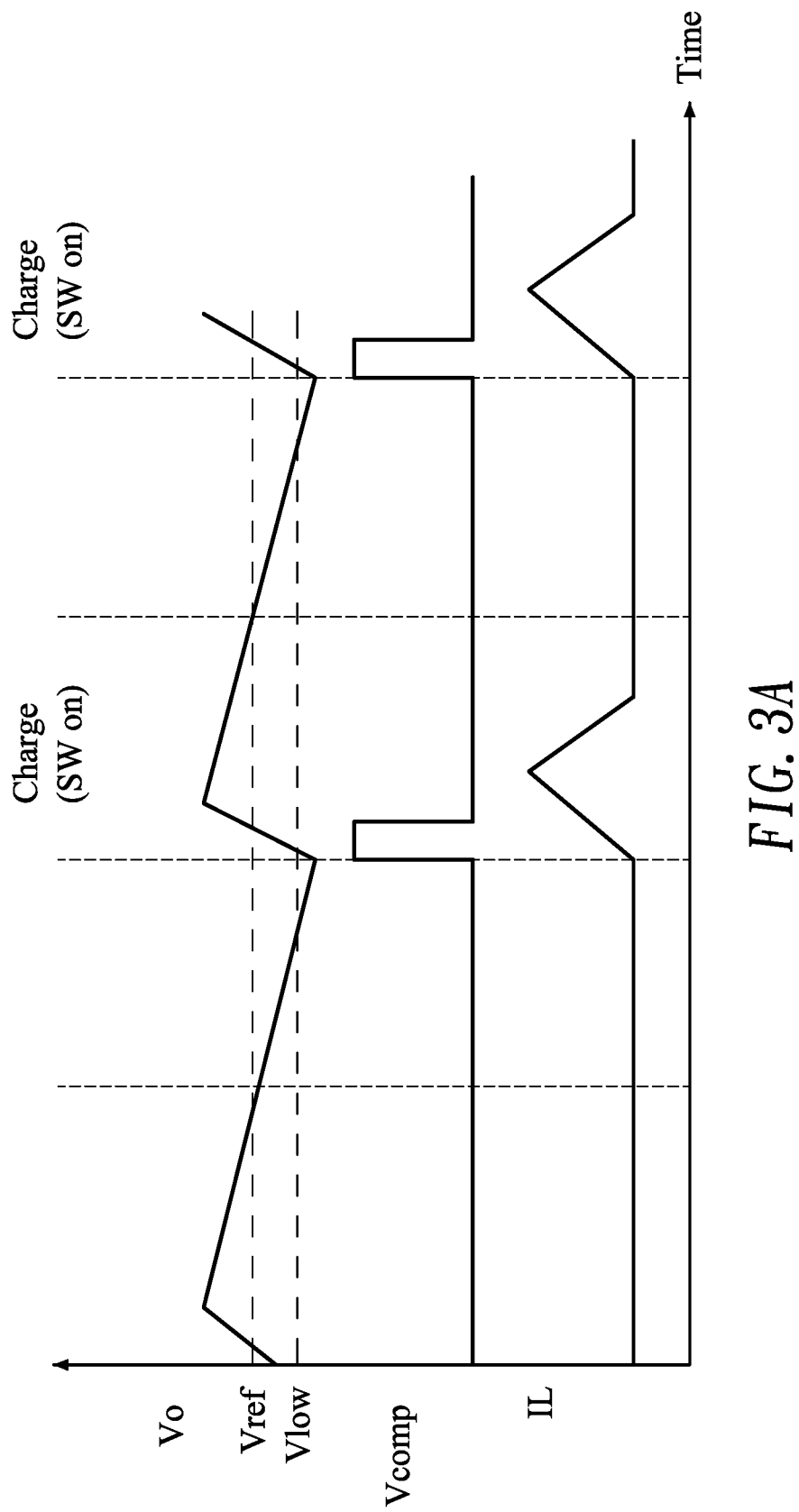
FIG. 3A shows an exemplary timing diagram illustrating pertinent signals of the charge skip determinator of FIG. 2 for one output node.

FIG. 3A shows an exemplary timing diagram illustrating pertinent signals of the charge skip determinator 114 of FIG. 2 for one output node Vo. In the diagram, an output voltage Vo, a reference voltage Vref, a threshold voltage Vlow, a compare result Vcomp and an inductor current IL are shown. It is noted that, in one embodiment, the skipping mode is determined by comparing the output voltage Vo with the threshold voltage Vlow, instead of the reference voltage Vref, where the threshold voltage Vlow is lower than the reference voltage Vref.

Figure 3B:
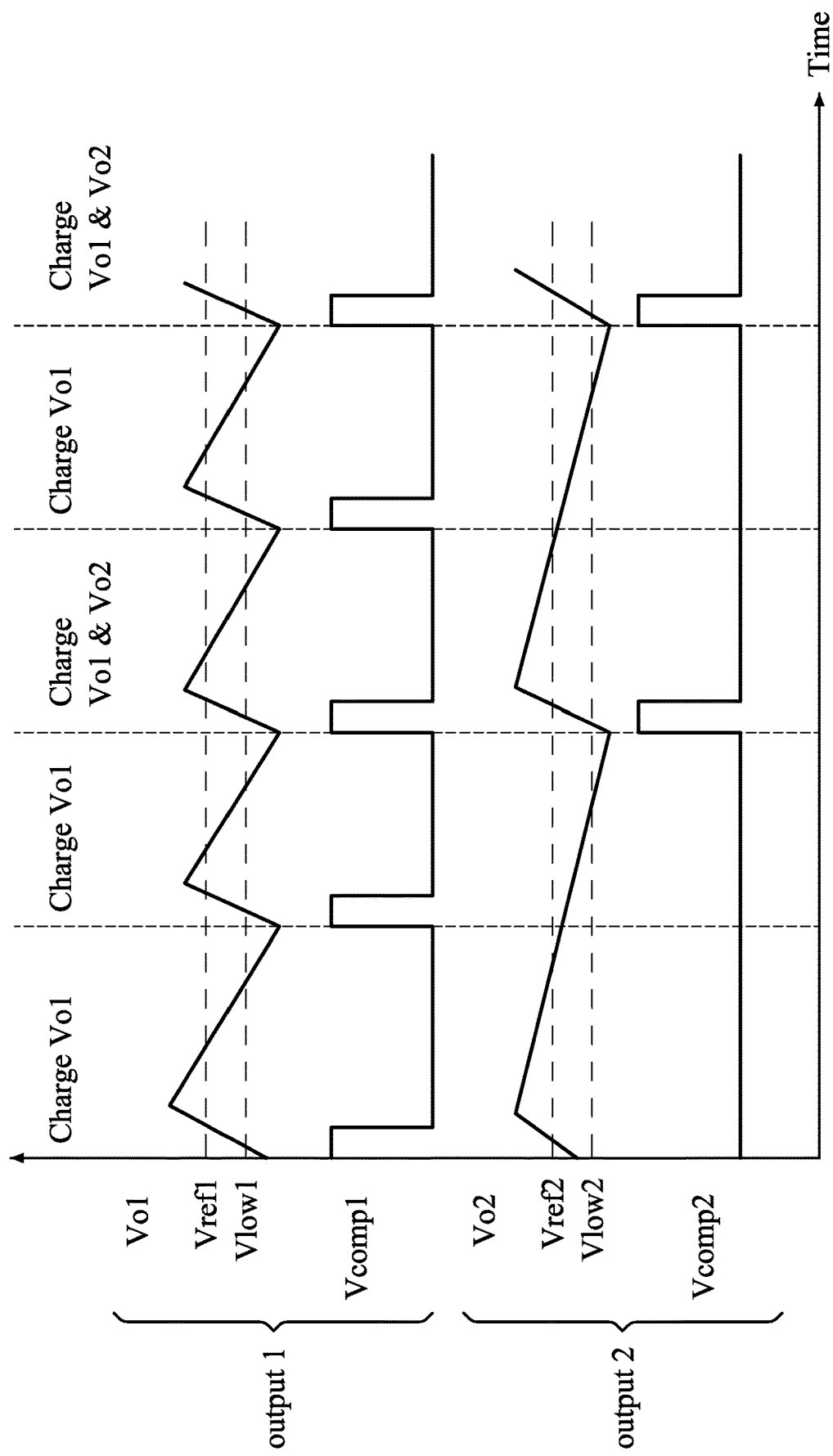
FIG. 3B shows another exemplary timing diagram illustrating pertinent signals of the charge skip determinator of FIG. 2 for two output nodes.

FIG. 3B shows another exemplary timing diagram illustrating pertinent signals of the charge skip determinator 114 of FIG. 2 for two output nodes Vo1-Vo2. In the diagram, output voltages Vo1/Vo2, reference voltages Vref1/Vref2, threshold voltages Vlow1/Vlow2 and compare results Vcomp1/Vcomp2 are shown. It is noted that, in one embodiment, the skipping mode is determined by comparing the output voltage Vo1/Vo2 with the threshold voltage Vlow1/Vlow2, instead of the reference voltage Vref1/Vref2, where the threshold voltage Vlow1/Vlow2 is lower than the reference voltage Vref1/Vref2.

Although specific embodiments have been illustrated and described, it will be appreciated by those skilled in the art that various modifications may be made without departing from the scope of the present invention, which is intended to be limited solely by the appended claims.

What is claimed is:

1. A single-inductor multiple-output direct-current to direct-current converter, comprising:
   a first power switch controlled by a first power switch signal and a second power switch controlled by a second power switch signal, connected in series between a positive supply voltage and a negative supply voltage, and interconnected at an input node;

a single inductor with a first end connected to the input node;

a plurality of output switches, controlled by corresponding output switch signals, connected in parallel with first ends connected to a second end of the inductor, second ends of the output switches, acting as output nodes, providing corresponding output voltages respectively; and a dual mode charge controller coupled to receive an input voltage at the input node, to receive the output voltages, to receive a state flag indicating operation status of load circuits powered by the output voltages, and configured to accordingly generate the first and second power switch signals and the output switch signals;

wherein the charge controller comprises:

a mode selector that selects among a plurality of modes of operation in the charge controller based on a quantity of load circuits being at sleep status, thereby generating a mode signal; and a plurality of loading controllers, one of which is activated by the mode signal, coupled to receive the output voltages and configured to generate the first and second power switch signals and the output switch signals.

2. The converter of claim 1, wherein the mode selector selects between two modes of operation in the charge controller according to the state flag, thereby generating the mode signal, the mode selector selecting a light loading mode when all load circuits powered by all output voltages are at sleep status as indicated by the state flag, otherwise, the mode selector selecting a heavy loading mode;

wherein the plurality of loading controllers comprises:

a light loading controller activated by the mode signal when the light loading mode is selected, coupled to receive the output voltages and configured to generate the first and second power switch signals and the output switch signals; and a heavy loading controller activated by the mode signal when the heavy loading mode is selected, coupled to receive the output voltages and configured to generate the first and second power switch signals.

3. The converter of claim 2, wherein the light loading controller comprises:

a first zero current detector that detects a zero inductor current in the inductor by comparing the input voltage and the negative supply voltage;

wherein the first and second power switches are turned off by the corresponding first and second power switch signals when the zero inductor current is detected by the first zero current detector.

4. The converter of claim 2, wherein the heavy loading controller comprises:

a second zero current detector that detects a zero inductor current in the inductor by comparing the input voltage and the negative supply voltage;

wherein the first and second power switches are turned off by the corresponding first and second power switch signals when the zero inductor current is detected by the second zero current detector.

5. The converter of claim 2, wherein the charge controller further comprises:

a charge skip determinator that designates an output node as a skipping mode to save power consumption by turning off a corresponding output switch, when power demand at said output node drops;

wherein the heavy loading controller in combination with the charge skip determinator generates the output switch signals to control the output switches.

6. The converter of claim 5, wherein the skipping mode is determined according to the output voltages and corresponding reference voltages respectively.

7. The converter of claim 6, wherein the skipping mode is designated when the output voltage at said output node is greater than a corresponding reference voltage.

8. The converter of claim 6, wherein the skipping mode is designated when the output voltage at said output node is greater than a corresponding threshold voltage, which is lower than a corresponding reference voltage.

9. A single-inductor multiple-output direct-current to direct-current converter, comprising:

a first power switch controlled by a first power switch signal and a second power switch controlled by a second power switch signal, connected in series between a positive supply voltage and a negative supply voltage, and interconnected at an input node;

a single inductor with a first end connected to the input node;

a plurality of output switches, controlled by corresponding output switch signals, connected in parallel with first ends connected to a second end of the inductor, second ends of the output switches, acting as output nodes, providing corresponding output voltages respectively; and a dual mode charge controller coupled to receive an input voltage at the input node, to receive the output voltages, to receive a state flag indicating operation status of load circuits powered by the output voltages, and configured to accordingly generate the first and second power switch signals and the output switch signals;

wherein the charge controller measures total energy required by all the output nodes, and provides same amount of the total energy from the input node, therefore the required energy and the provided energy are substantially equal.

* * * * *